(12) United States Patent
Leadingham

(10) Patent No.: US 10,498,248 B2
(45) Date of Patent: Dec. 3, 2019

(54) DUAL FUNCTION SOLID STATE CONVERTER SWITCH

(71) Applicant: Illinois Tool Works, Inc., Glenview, IL (US)

(72) Inventor: David W Leadingham, Bradenton, FL (US)

(73) Assignee: ITW, Inc., Glenview, IL (US)

( * ) Notice: Subject to any disclaimer, the term of this patent is extended or adjusted under 35 U.S.C. 154(b) by 0 days.

(21) Appl. No.: 15/874,242

(22) Filed: Jan. 18, 2018

(65) Prior Publication Data

US 2018/0159438 A1 Jun. 7, 2018

Related U.S. Application Data

(63) Continuation of application No. 13/450,562, filed on Apr. 19, 2012, now Pat. No. 10,014,790.

(51) Int. Cl.
*H02M 5/458* (2006.01)
*H02M 7/217* (2006.01)
(Continued)

(52) U.S. Cl.
CPC .......... *H02M 5/458* (2013.01); *H02M 7/217* (2013.01); *B64F 1/305* (2013.01); *H02M 2001/008* (2013.01)

(58) Field of Classification Search
CPC ................. H02M 5/458; H02M 7/217; H02M 2001/008; H02M 55/45; B64F 1/305
See application file for complete search history.

(56) References Cited

U.S. PATENT DOCUMENTS 2,820,610 A * 1/1958 Martinez ................. E21B 25/16
175/249
3,781,624 A * 12/1973 Tullis ...................... G01F 1/002
318/482
(Continued)

*Primary Examiner* — Jared Fureman
*Assistant Examiner* — Emmanuel Dominique
(74) *Attorney, Agent, or Firm* — Law Offices of Eugene M. Cummings, P.C.

(57) ABSTRACT

A dual function solid state power converter operable from a three phase AC input current simultaneously provides; an AC or DC output current on an aircraft power cable which extends from a stowed position to provide ground power to a parked aircraft, and a low voltage DC current on a battery charging power cable which extends from a stowed position to charge batteries in nearby service vehicles. The power converter includes an AC to DC converter which converts the AC input current to a DC current on an internal DC bus, a DC to AC converter which converts the DC bus current to an AC current at a higher voltage and frequency, or a DC to DC converter which converts the DC bus current to a lower voltage DC, for supplying ground power by means of a connecting cable to a parked aircraft, and a DC to DC converter for converting the DC bus current to a lower voltage battery charging current on the battery charging cable. In an airport environment the power converter may be advantageously mounted on a passenger boarding bridge and a motion inhibit circuit may be provided to prevent movement of the boarding bridge when either the aircraft ground power cable or battery charging cable are not in a stowed position. The power converter may also be mounted on a wheeled cart for positioning by a tug, or installed in a remote stationary position.

4 Claims, 8 Drawing Sheets

(51) Int. Cl.
*B64F 1/305* (2006.01)
*H02M 1/00* (2006.01)

(56) References Cited

U.S. PATENT DOCUMENTS

| | | | | |
|---|---|---|---|---|
| 4,937,720 | A * | 6/1990 | Kirchberg | H02M 5/272 363/35 |
| 7,541,687 | B2 * | 6/2009 | Stahlhut | H02P 9/00 290/52 |
| 7,573,228 | B2 * | 8/2009 | Karner | H02J 7/0068 320/104 |
| 2005/0198750 | A1 * | 9/2005 | Spencer | B64F 1/002 14/71.5 |
| 2008/0304948 | A1 * | 12/2008 | Ganiere | B64F 1/305 414/541 |
| 2010/0201197 | A1 * | 8/2010 | Shires | H02J 1/10 307/73 |

* cited by examiner

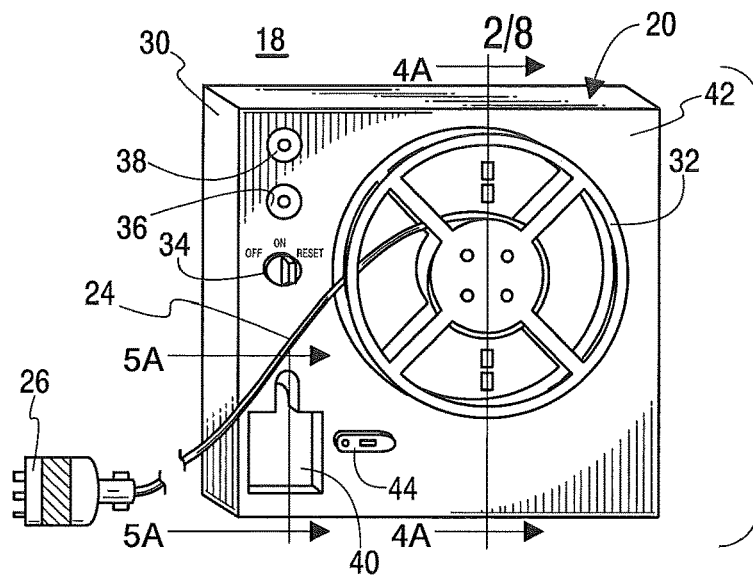
*Fig. 3A*
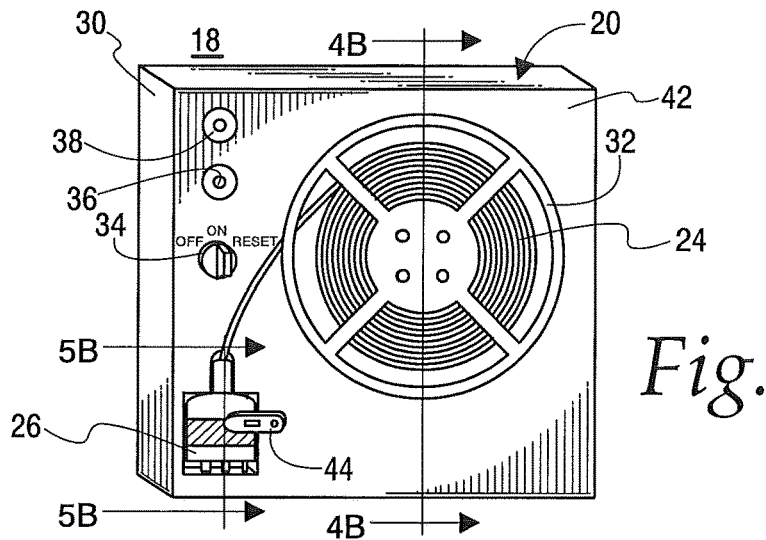
*Fig. 3B*
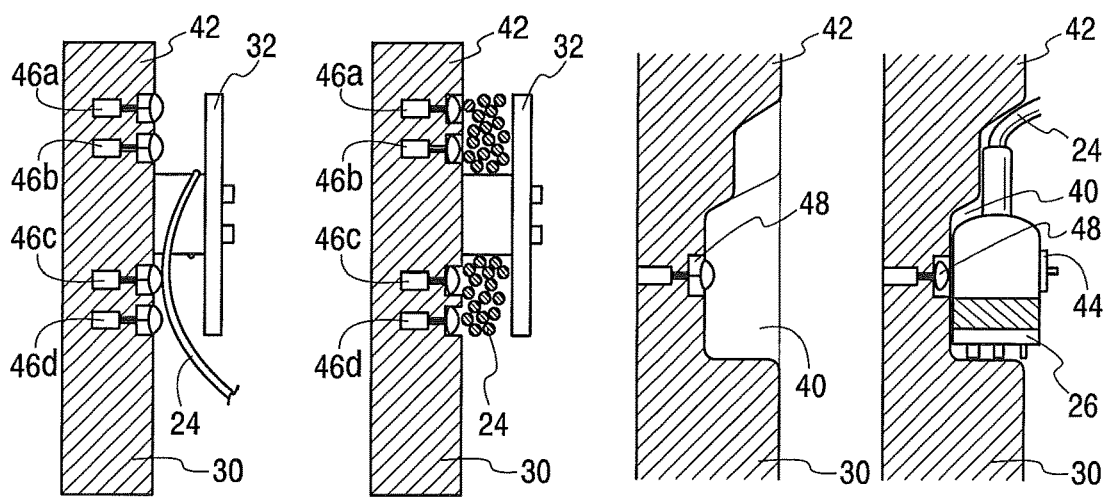
*Fig. 4A*   *Fig. 4B*   *Fig. 5A*   *Fig. 5B*

DUAL FUNCTION SOLID STATE CONVERTER SWITCH

CROSS-REFERENCE TO RELATED APPLICATION

This application claims benefit of U.S. Non-Provisional patent application Ser. No. 13/450,562 filed Apr. 19, 2012 which is hereby incorporated by reference in its entirety herein.

BACKGROUND OF THE INVENTION

I. Field of the Invention

The present disclosure relates generally to electrical power management in airport environments, and more particularly, to a multi-function solid state converter which simultaneously supplies AC or DC ground power to a parked aircraft and DC battery charging current to one or more electrically-powered ground support vehicles, such as electric aircraft tugs or electric cargo loaders.

II. Description of the Prior Art

Ground support equipment, such as aircraft tugs or cargo loaders, has been predominantly powered by internal combustion engines that burn gasoline or diesel fuel. With advances in technology related to electrically powered vehicles, electrically powered ground support equipment has become more cost effective to operate and more prevalent at airports, particularly where emissions and noise are critical environmental considerations.

While the increased use of electrically powered ground support equipment has reduced the demand for petroleum based fuels at airports, the need for charging the batteries of such equipment has imposed capacity requirements on airport electrical power distribution systems. Moreover, these power distribution systems often run over considerable distances, and additional electrical distribution centers have to be installed to support battery charging at multiple remote locations. This has undesirably added to the expense of introducing more electrically powered ground support equipment at airports.

One way to mitigate the need for additional electrical power distribution centers at airports is to have ground support equipment battery charging accomplished by equipment that is already installed and used on a low duty cycle basis, such as, for example, the power converters used to supply ground power to parked aircraft. These power converters are often installed on the aircraft boarding passenger bridges used at airports to provide a walkway between parked aircraft and a terminal gate for loading unloading passengers, and are typically powered into an extended position following aircraft arrival at the gate and is returned to a retracted position just prior to aircraft departure.

In accordance with the present disclosure, a dual-function solid-state converter, which may be advantageously mounted on a passenger boarding bridge, is provided to supply ground power to a parked aircraft and battery charging power to nearby electrically powered ground support equipment.

One problem that may arise with charging ground support equipment from a power converter mounted on an aircraft boarding bridge is that movement of the bridge may damage parked ground support vehicles under charge and the cables supplying battery charging current to these vehicles. In further accord with the present disclosure, a dual function converter is provided with an electrical interlock circuit which prevents movement of the passenger bridge when the battery charging function of the converter is in use.

Accordingly, it is a general object of the present disclosure to provide a dual function solid state power converter which, in addition to supplying ground power to parked aircraft, provides power for efficiently charging the batteries of aircraft ground support vehicles.

It is a more specific object of the present disclosure to provide a dual function solid state converter for supplying ground power to an aircraft and power for charging batteries, which is mounted on a passenger boarding bridge and includes a circuit for inhibiting motion of the bridge when the battery charging function is in use.

These and other objects, features and advantages of this disclosure will be more clearly understood through a consideration of the following detailed description.

SUMMARY OF THE DISCLOSURE

According to one embodiment of the present disclosure, there is provided a dual purpose power converter operable from an applied alternating current supply and providing a primary AC or DC output current for aircraft ground power and a secondary DC output current for battery charging, the power converter being adapted for use in a jetway adapted to service an aircraft parked on an associated ramp. The power converter includes a first cable set for connecting the primary AC or DC output current to the aircraft and a second cable set for connecting the secondary DC output current to a ground service vehicle parked on the ramp, whereby the second cable set has a deployed state enabling the cable to extend to the ramp to connect to the ground service vehicle and a retracted state depending from the jetway and free and clear of the ramp. The jetway includes an electrically-powered positioning system for positioning the jetway on the ramp relative to the aircraft and a motion inhibit circuit for preventing movement of the jetway when the second cable set is not retracted.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 3A is a front view of the reel and cable assembly of FIG. 2 showing the battery charging cable and associated connector in an extended and operational state.

FIG. 3B is a frontal view of the reel and cable assembly of FIG. 2 with the power cable and connector in a stowed and inoperative state.

FIG. 4A is a cross-sectional view of reel and cable assembly of FIG. 2 taken along lines 4A-4A of FIG. 3A.

FIG. 4B is a cross-sectional view of the reel and cable assembly of FIG. 2 taken along lines 4B-4B of FIG. 3B.

FIG. 5A is a cross-sectional view of the reel and cable assembly of FIG. 2 taken long lines 5A-5A of FIG. 3A.

FIG. 5B is a cross-sectional view of the reel and cable assembly of FIG. 2 taken along lines 5B-5B of FIG. 3B.

DESCRIPTION OF THE PREFERRED EMBODIMENTS

The following description of the preferred embodiments is merely exemplary in nature and is in no way intended to limit the disclosure, its application or use.

Figure 1:
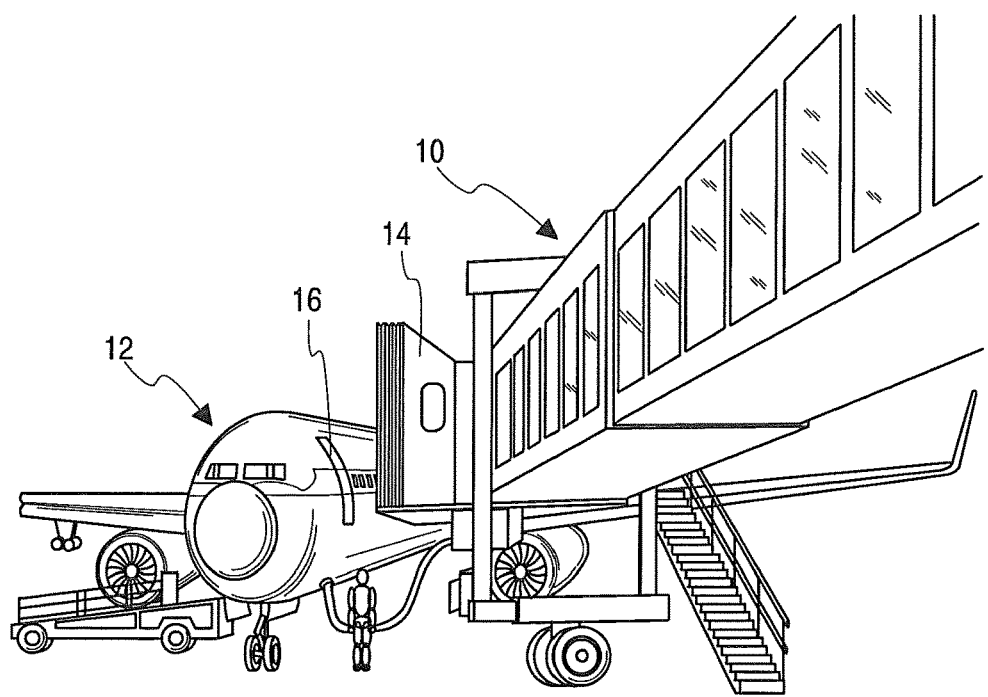
FIG. 1 is a perspective view of a passenger boarding bridge having a multiple function solid state power converter mounted thereon, showing the power converter connected to supply ground power to an adjacent parked aircraft.

Referring to the drawings, FIG. 1 illustrates a passenger boarding bridge 10 of conventional design and construction for boarding an aircraft 12. The passenger boarding bridge 10 provides an enclosed, movable passageway which extends from an airport terminal gate (not shown) to a door 16 of the aircraft, allowing passengers to board and disembark the aircraft without being exposed to weather. The aircraft engaging end of the passenger boarding bridge is typically movable; moving up and down, swinging left and right, and extending toward and away from the aircraft. Movement of the bridge is accomplished by multiple electric motors which receive power through a power cable (not shown) extending along the bridge to the terminal.

Figure 2:
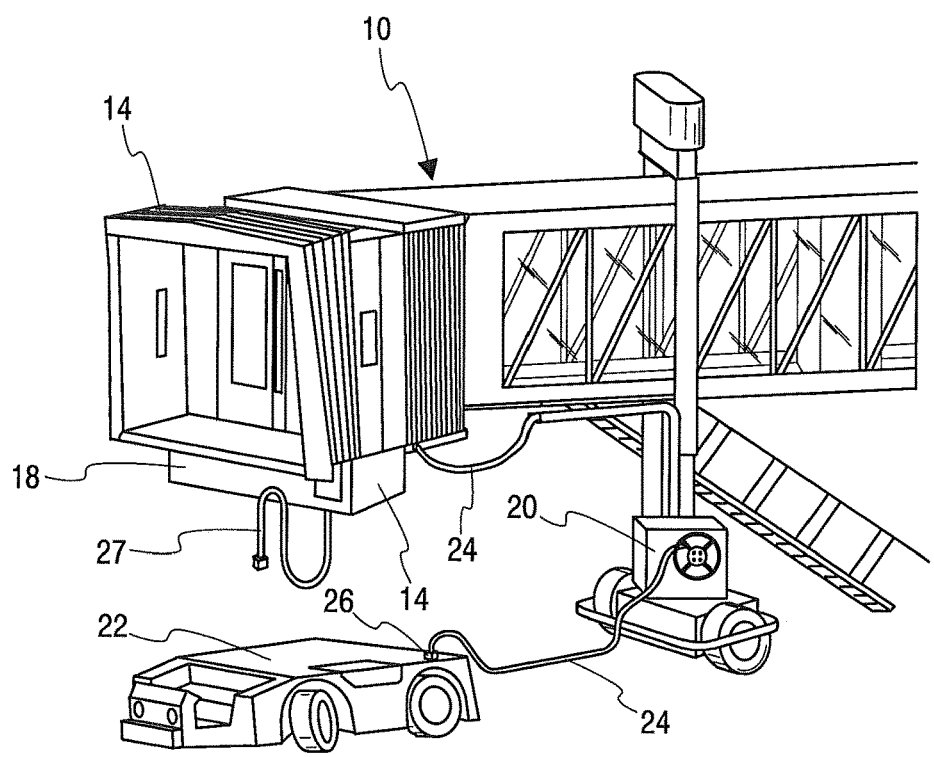
FIG. 2 is a perspective view of the passenger bridge of FIG. 1 showing the multiple function solid state power converter connected to an electrically powered aircraft tug by means of an associated reel and cable assembly to charge the batteries of the tug.

FIG. 2 illustrates the passenger boarding bridge 10 of FIG. 1 in a retracted position and incorporating a dual function solid state power converter 18 of the present disclosure mounted under the cab 14 of the bridge. A reel and cable assembly 20 mounted on the wheeled carriage of the bridge enables the power converter to be connected to a parked electrically powered aircraft tug 22 by means of a cable 24 and a cable end connector 26.

The power converter 18 receives power from the terminal by means of a cable (not shown) extending along the passenger boarding bridge. The power converter supplies ground power to aircraft 12 by means of a power cable 27, and battery charging power to tug 22 by means of a power cable 24. To prevent the boarding bridge from moving while tug 22 is being charged, which could result in physical damage to tug 22 or power cable 24, sensors within reel and cable assembly 20 detect when power cable 24 is not stowed on the reel, and is therefore in use.

Referring first to FIG. 3A, a frontal perspective view of the housing 30 of reel and cable assembly 20 is shown with cable 24 unwound from a storage reel 32. In this condition, with power switch 34 in the on position, power available indicator 36 is illuminated and cable stowed indicator 38 is not illuminated. Furthermore, the power connector 26 in this condition is not seated within the recess 40 provided on the front panel of housing 30 for stowing the connector. In contrast, the frontal perspective view of FIG. 3B shows the assembly 20 with power connector 26 in a stowed position in recess 40, secured by a clamp 44, and power cable 24 wrapped around storage reel 32. In this condition, indicator 36 is not illuminated, indicator 38 is illuminated, and movement of the passenger boarding bridge is enabled.

The motion inhibiting function of reel and cable assembly 20 is further shown in FIGS. 4A, 4B, 5A and 5B. Referring to FIG. 4A, when power cable 24 is unwound from the reel 32, multiple spring-biased pressure switches 46a-46d are unactuated and electrically open. Moreover, as shown in FIG. 5A, when connector 26 is not in recess 40, a spring-biased pressure switch 48 is unactuated and electrically open. If any one of switches 46 and 48 is in the open position, the power cable stowed indicator 38 is not illuminated and movement of the passenger bridge is inhibited. By contrast, as shown in FIG. 4B, when power cable 24 is wound around reel 32, the spring-biased pressure switches 46a-46d are actuated to an electrically closed condition. Moreover, as shown in FIG. 5B, when connector 26 is seated in recess 40 and locked in place by latch 44, spring-biased pressure switch 48 is actuated to an electrically closed condition. When all of the cable position sensing switches (46a, 46b, 46c, 46d and 48) are in their electrically closed condition, cable stowed indicator 38 illuminates and movement of passenger bridge 10 is enabled.

Figure 6:
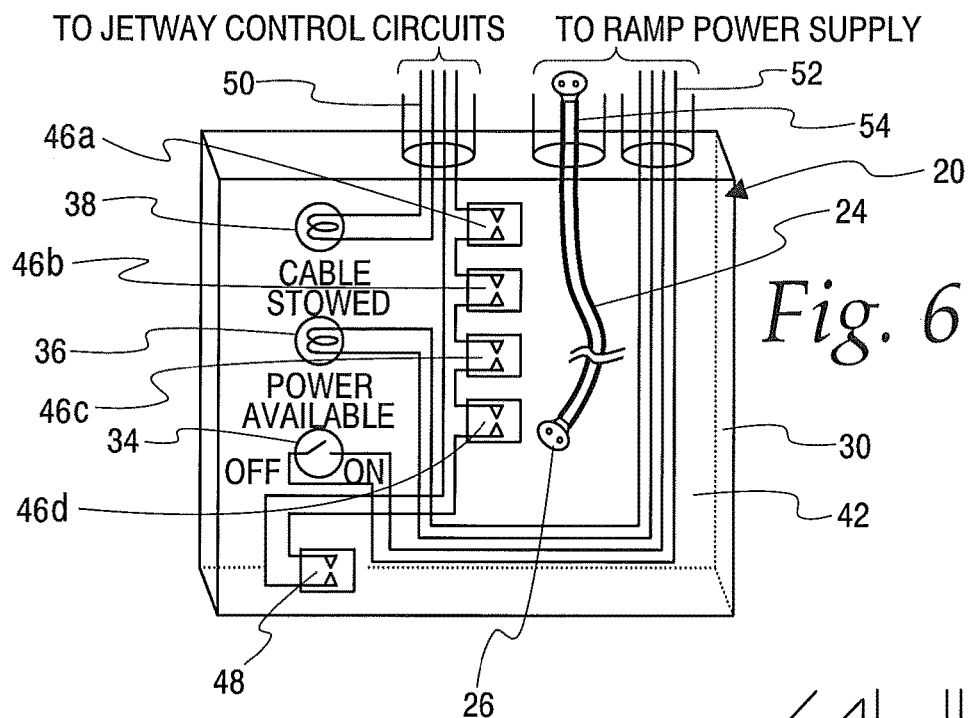
FIG. 6 is a simplified schematic diagram of control and indicator circuitry contained within the reel and cable assembly of FIG. 2.

Referring to FIG. 6, pressure actuated switches 46a, 46b, 46c and 46d and 48 are electrically connected in series and through a cable 50 to the cab 14 of passenger boarding bridge 10 to prevent the positioning motors associated with the boarding bridge from being actuated when any of the five switches is not in an electrically closed condition. The cable stowed indicator 38 is powered from the boarding bridge control circuitry through cable 30 to indicate to ramp personnel that the passageway is enabled for movement.

The power control switch 34 provided on the front panel 42 of housing 30 is connected through a cable 52 to the control circuit of the dual function solid state power converter 18 such that the availability of battery charging power on power cable 24 can be controlled by ramp personnel. The power available indicator 36 is also powered through cable 52 by the power converter to indicate that battery charging power is available. The battery charging power cable 24 is connected to power converter 18 through a separate cable 54.

Figure 7:
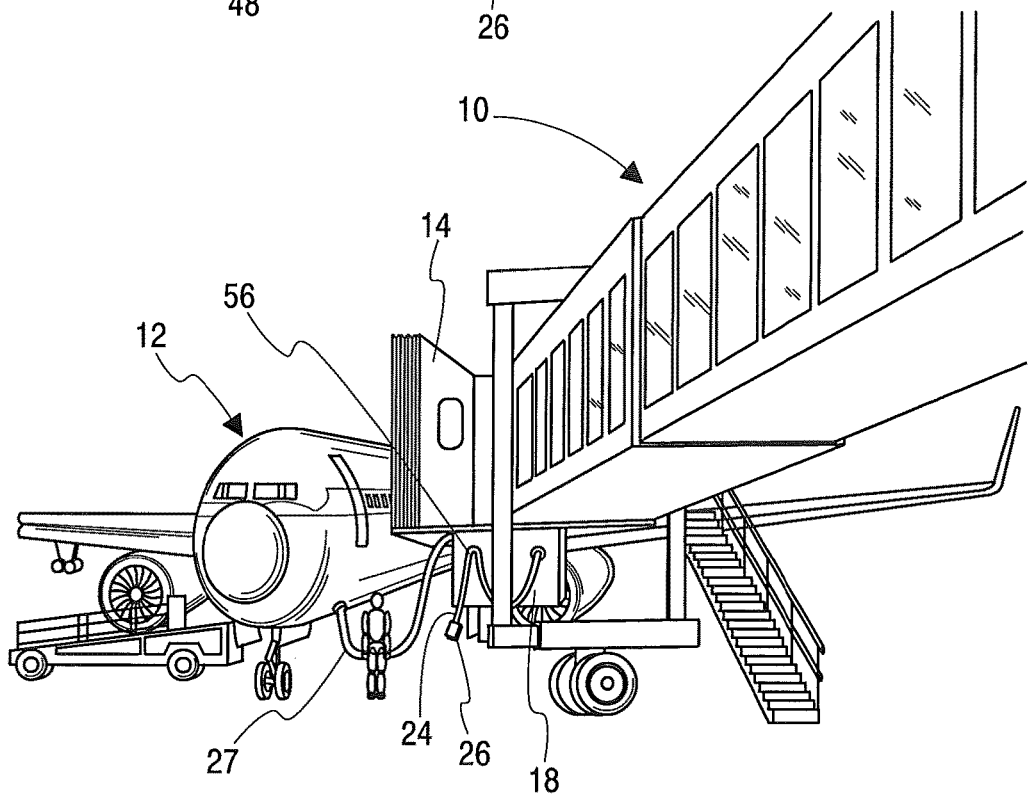
FIG. 7 is a perspective view of a passenger boarding bridge incorporating an alternate embodiment of the dual purpose solid state power converter of the present disclosure wherein the battery charging output cable is suspended from a hanger mounted on the housing of the power converter when not in use.
Figure 8:
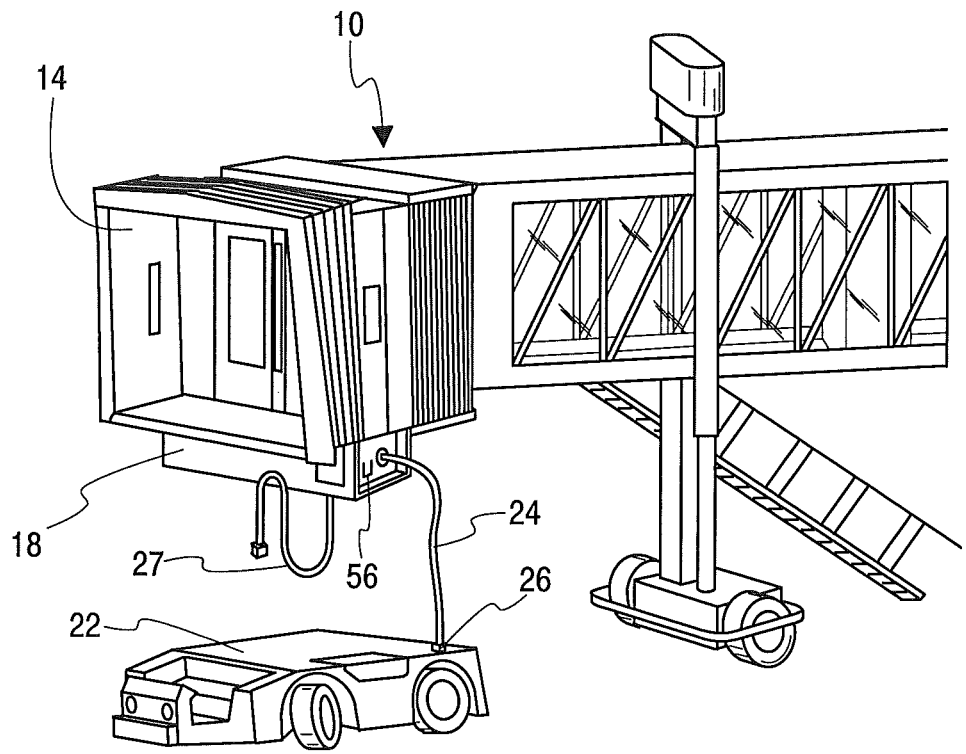
FIG. 8 is a perspective view of the alternate embodiment of FIG. 7 showing the battery charging cable connected to an adjacent electrically powered aircraft tug.
Figure 9:
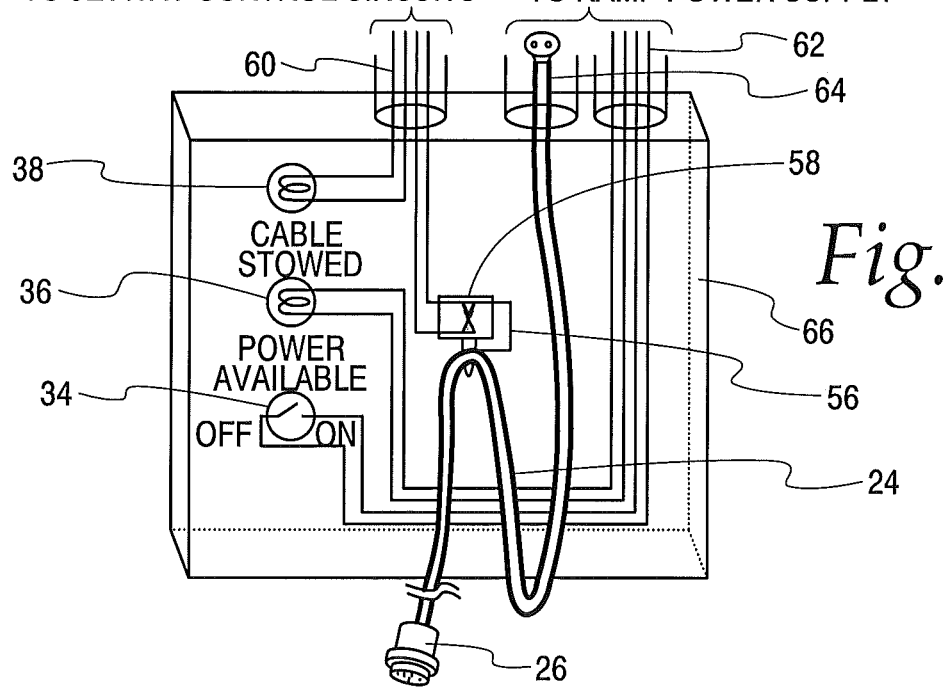
FIG. 9 is a simplified schematic diagram of control and indicator circuitry incorporated in the dual purpose power converter shown in FIGS. 7 and 8.

An alternative embodiment of the disclosure, wherein the battery charging cable 24 is suspended directly from power converter 18, is shown in FIGS. 7-9. Referring to FIG. 7, when in its stowed position, the battery charging power cable 24 is suspended from a hanger assembly 56 on the side of the housing of power converter 18. When battery charging cable 24 is in use and connected to the electrically powered tug 22, the cable is removed from hanger 56 as shown in FIG. 8.

Referring to FIG. 9, hanger assembly 56 is mechanically coupled to a spring-biased pressure-actuated switch 58 such that when power cable 24 is hanging from the hanger assembly in a stowed condition, switch 58 is actuated to an electrically closed condition. Conversely, when power cable 24 is removed from hanger 58 for use, switch 58 reverts to an electrically open condition and movement of passenger bridge 10 is inhibited. A cable 60 provides connections between switch 58 and the passenger bridge control circuits, as well as connections to the cable stowed indicator 38. A cable 62 provides connections between the battery charging control switch 34 and power converter 18, as well as connections between power available indicator 36 and power converter 18. Another cable 64 may be provided to supply battery charging power to cable 24 from power converter 18.

It will be appreciated that in practice the sensing, control and indicating circuitry shown in FIG. 9 may be incorporated directly into the enclosure of power converter 18. Alternatively, a separate enclosure 66 mounted on the outside surface of the power converter enclosure can be provided as shown in FIG. 9.

Figure 10:
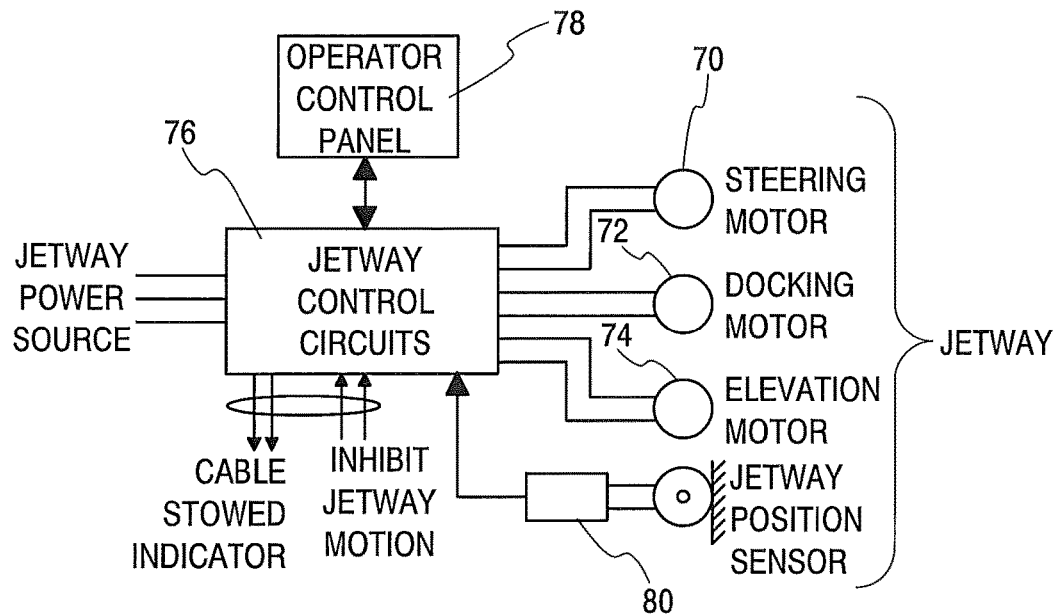
FIG. 10 is a simplified functional block diagram of circuitry associated with the dual purpose power converter of FIGS. 1 and 2 for inhibiting motion of the passenger boarding bridge when the power converter is being utilized to charge ground support equipment.

As previously described, passenger boarding bridge 10 is positioned by means of electric motors such that it allows passengers to step from the end of the bridge into the door 16 of parked aircraft 12. Referring to FIG. 10, the bridge positioning system is seen to comprise a first electric motor 70 for steering the cab 14 of the bridge left and right. A second electric motor 72 is provided for extending and retracting the bridge toward and away from the parked aircraft. A third electric motor 74 is provided to raise and lower the bridge to accommodate the height of the aircraft door. Together, motors 70, 72 and 74 allow the passenger boarding bridge 10 to accommodate a wide range of aircraft parked at the gate associated with the bridge.

The three bridge positioning motors, 70, 72 and 74, are controlled by control circuits 76 in response to operator inputs entered by means of an operator control panel 78 in the cab 14 of the bridge 10. In addition, the bridge positioning system may include a position sensor 80 which provides an additional input to control circuits 76 such that small variations in the height of the aircraft are automatically accommodated by the bridge elevation motor 74.

As previously described, and in accordance with one aspect of the disclosure, the function of control circuits 76 is inhibited when the battery charging function of the dual purpose solid state converter 18 is in use. In particular, when power cable 24 is removed from reel 32 to connect to tug 22 or other electrically powered ground service equipment, a switch is actuated as previously described to provide an inhibit signal to control circuits 76 which prevent the control circuits from supplying power to any of motors 70, 72 and 74, regardless of operator inputs on control panel 78. When the battery charging function is complete and the battery charging power cable 24 is restored to its storage condition on reel 32, or, in the case of the embodiment of FIGS. 7-9, on hangar 56 to actuate switch 58, the inhibit signal is removed and control circuits 76 are again fully functional to allow positioning of passenger boarding bridge 10. Power available indicator 36 may be powered by control circuits 76 to indicate when the charging function is active and motion of the passenger boarding bridge is inhibited.

In practice, the bridge positioning motors and associated control circuits are powered by a three phase AC power source which may, or may not, be the same power source that powers the dual purpose solid state power converter 18.

Figure 11:
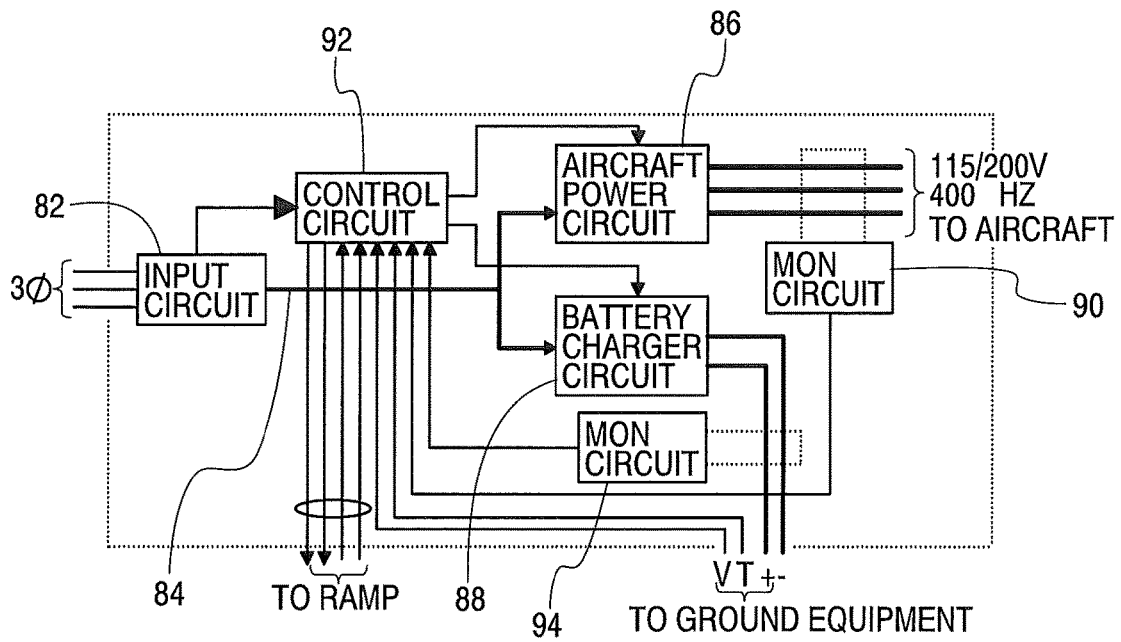
FIG. 11 a simplified functional block diagram of the dual purpose power converter of FIGS. 1 and 2.

Referring to FIG. 11, the dual purpose solid state power converter 18 includes an input circuit 82 which receives three phase power from power distribution circuits in the airport terminal. This input circuit 82 converts the three phase AC signal to a DC signal on a bus 84 which is supplied to an aircraft power circuit 86 and to a battery charging circuit 88. The aircraft power circuit 82 converts the DC power from bus 84 to meet aircraft ground power requirements, in the present embodiment, a three phase 115-200 volt 400 hertz current which is supplied as ground power to a parked aircraft. A monitoring circuit 90 may be provided to monitor the current and voltage supplied to the aircraft and to cause a control circuit 92 to interrupt power to the aircraft should predetermined limits be exceeded.

The battery charger circuit 88 converts the DC power on bus 84 to a lower voltage controlled DC current appropriate for charging batteries in ground service equipment. Typically, this voltage will be in the order of 28 volts DC and the current provided will be low, typically in the order of 20 amps or less, depending on battery condition. A monitoring circuit 94 monitors the output of battery charger circuit 88 to interrupt operation of the charger circuit in the event predetermined current or voltage limits are exceeded. Additionally, voltage and temperature monitoring circuits may be provided in association with the batteries under charge in the ground service equipment to adjust the charging voltage or the charging current as required.

Control circuit 92 includes connections to a battery charging ramp control panel to signal when the battery charger is in use and to allow ramp personnel to control the charging function. Additional connections are provided for ramp personnel to control the application of ground power to the aircraft.

Figure 12:
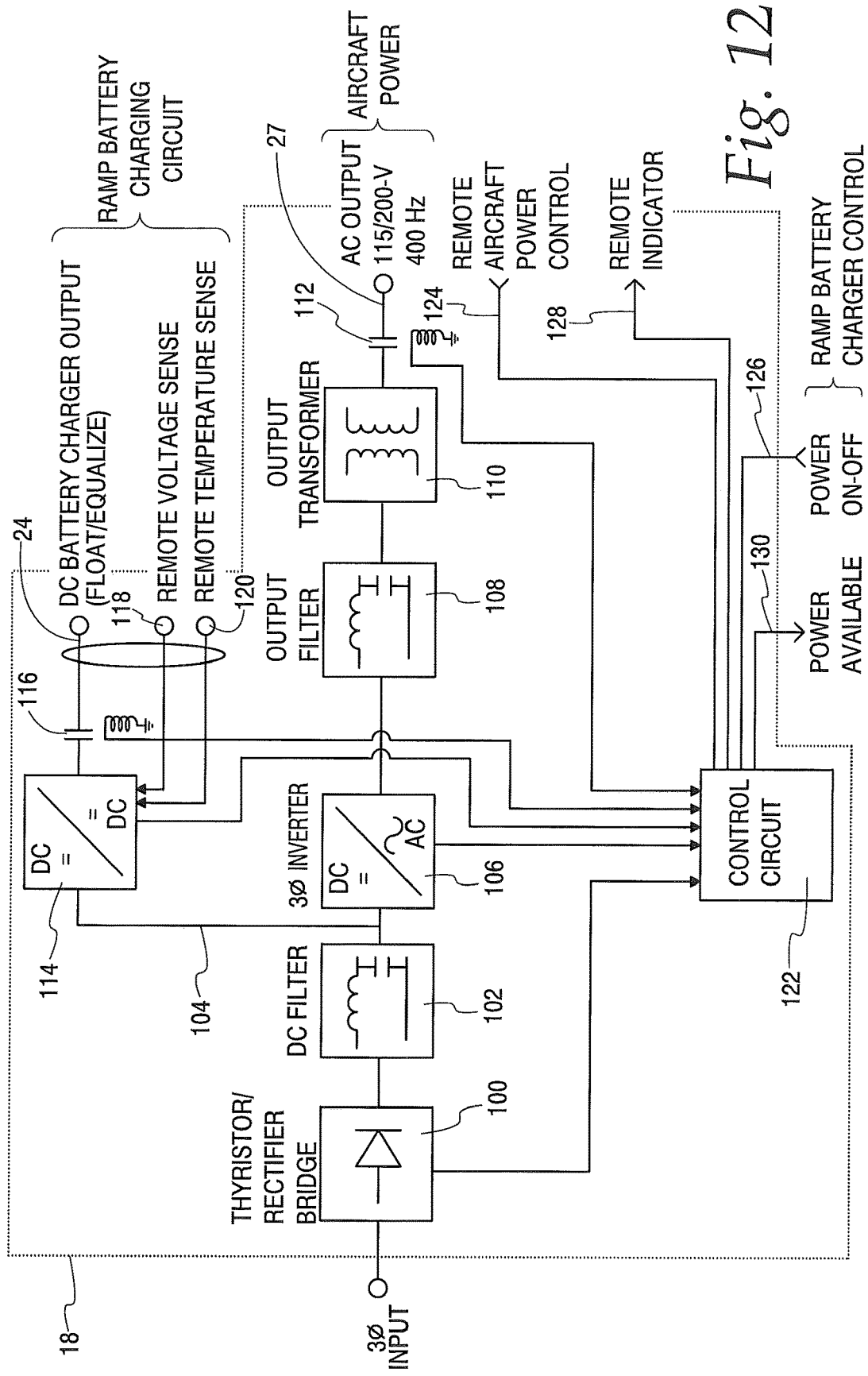
FIG. 12 is a simplified partial schematic and functional block diagram of the dual purpose power converter of FIGS. 1 and 2.

Referring to FIG. 12, the dual function power converter 18 may include a thyristor rectifier bridge circuit 100 and DC filter 102 of conventional design and construction which converts a three-phase AC supply current to a direct current on an internal bus 104. This direct current is applied to a three-phase inverter 106 of conventional design and construction which converts the DC to a 400 hertz three-phase 115/200-volt signal. This 400-hertz signal is filtered by a conventional filter circuit 108 and applied to the primary windings of a three-phase output transformer 110. The secondary windings of output transformer 110 are connected through a contactor 112 to cable 27 (not shown in FIG. 12) which connects the power supply to the electrical system of a parked aircraft.

In accordance with the disclosure, the DC current developed on bus 104 is simultaneously applied to a DC to DC converter 114 of conventional design and construction. The lower voltage DC output of this converter, typically 28 volts DC, is connected through a contactor 116 to battery charging current power cable 24 (not shown in FIG. 12) for charging batteries in electrically-powered aircraft tugs or other electrically-powered ground service equipment. The ramp vehicle being thus charged may include a voltage sensor and a temperature sensor which provide signals to inputs 118 and 120, respectively, of the DC to DC converter circuit. These sensing signals are utilized by the converter circuit to maintain a charging current and voltage at the vehicle appropriate to the condition of the vehicle's battery.

The dual function power converter 18 preferably further includes a control circuit 122 which functions to control the operation of thyristor rectifier 100, DC to AC inverter 106, and DC to DC converter 114 in response to control signals applied to the converter at inputs 124 and 126. Control circuit 122 further controls contactors 112 and 116, and provides an external indication at 128 that aircraft supply current is available and at 130 that battery charging current is available.

Figure 13:
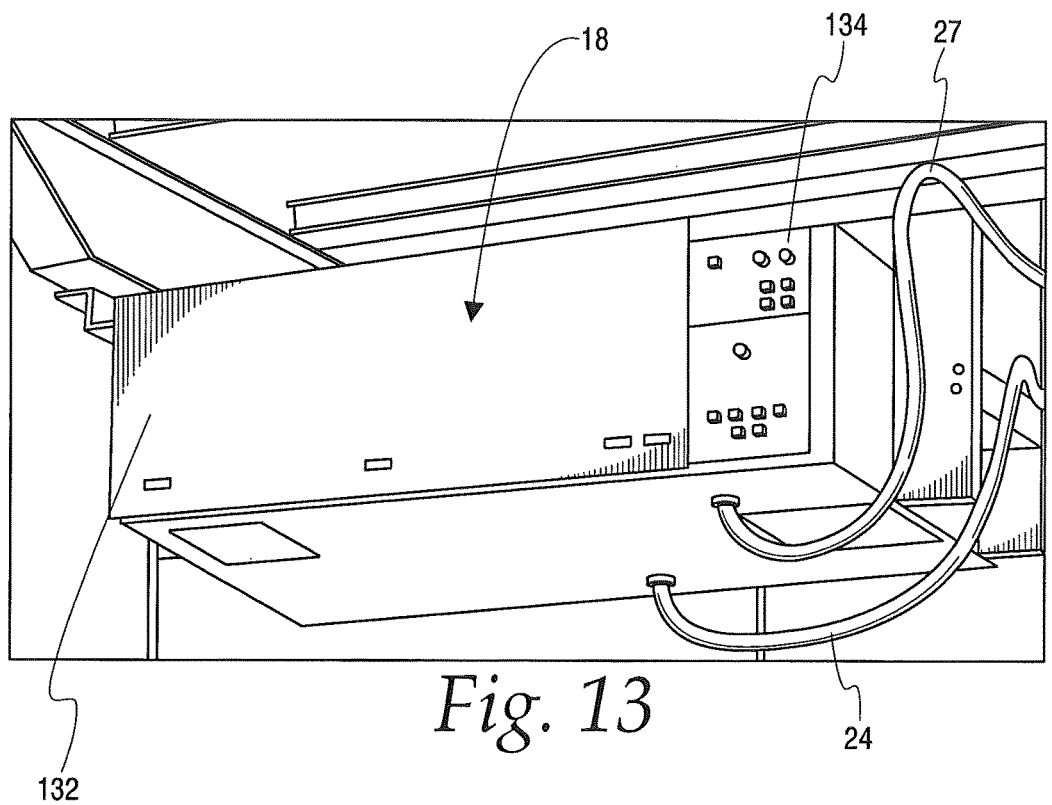
FIG. 13 is an enlarged perspective view of a dual function power converter constructed in accordance with the disclosure mounted under the cab of a passenger boarding bridge.

Referring to FIG. 13, dual function power converter 18 is preferably enclosed within an enclosure 132 which provides protection against the weather while providing the internal circuitry of the converter with adequate ventilation and heat dissipation. In the case of the converter being utilized in conjunction with a passenger boarding bridge, the converter may be advantageously mounted under the jetway with input power being provided to the converter by a cable extending the length of the bridge. The power output cables associated with the converter may be suspended from the bridge, or from the power converter enclosure, in the manner previously described. A control panel 134 may be provided on the exterior of the housing to provide for control and monitoring of the converter by ramp personnel.

Figure 14:
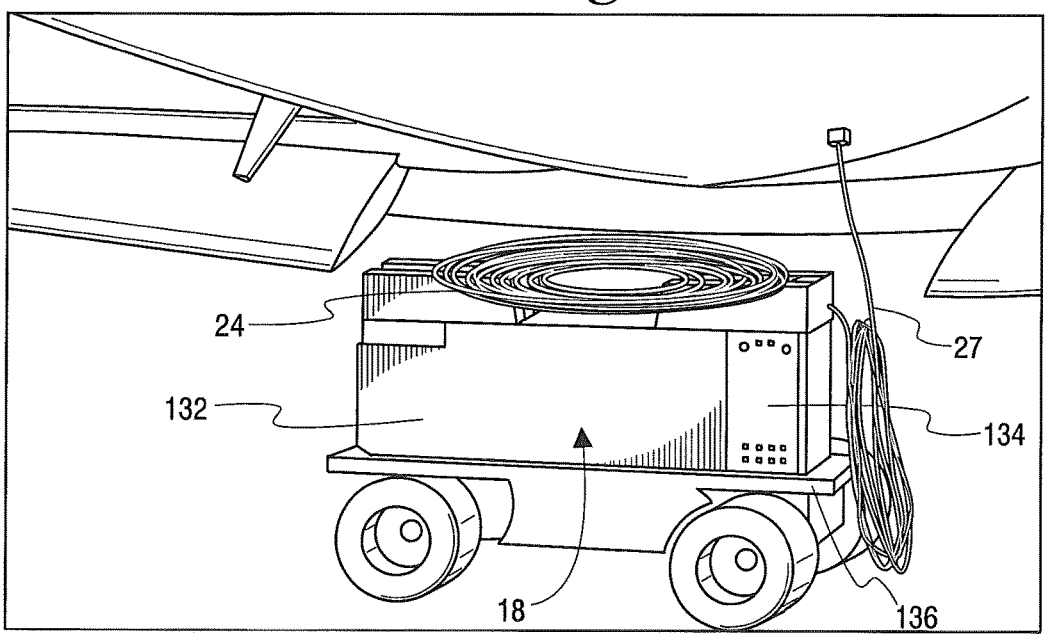
FIG. 14 is an enlarged perspective view of a dual function power converter constructed in accordance with the disclosure mounted on a wheeled trailer for positioning by a tug.

It will be appreciated that the power converter 18 can be alternatively mounted on a wheeled cart 136 and towed by a tug to an operating position, as shown in FIG. 14. Or, the power converter can be installed in a stationary position, such as within an airport terminal, and connected to an aircraft and electrically powered ground support equipment by a power cable of appropriate length.

Figure 15:
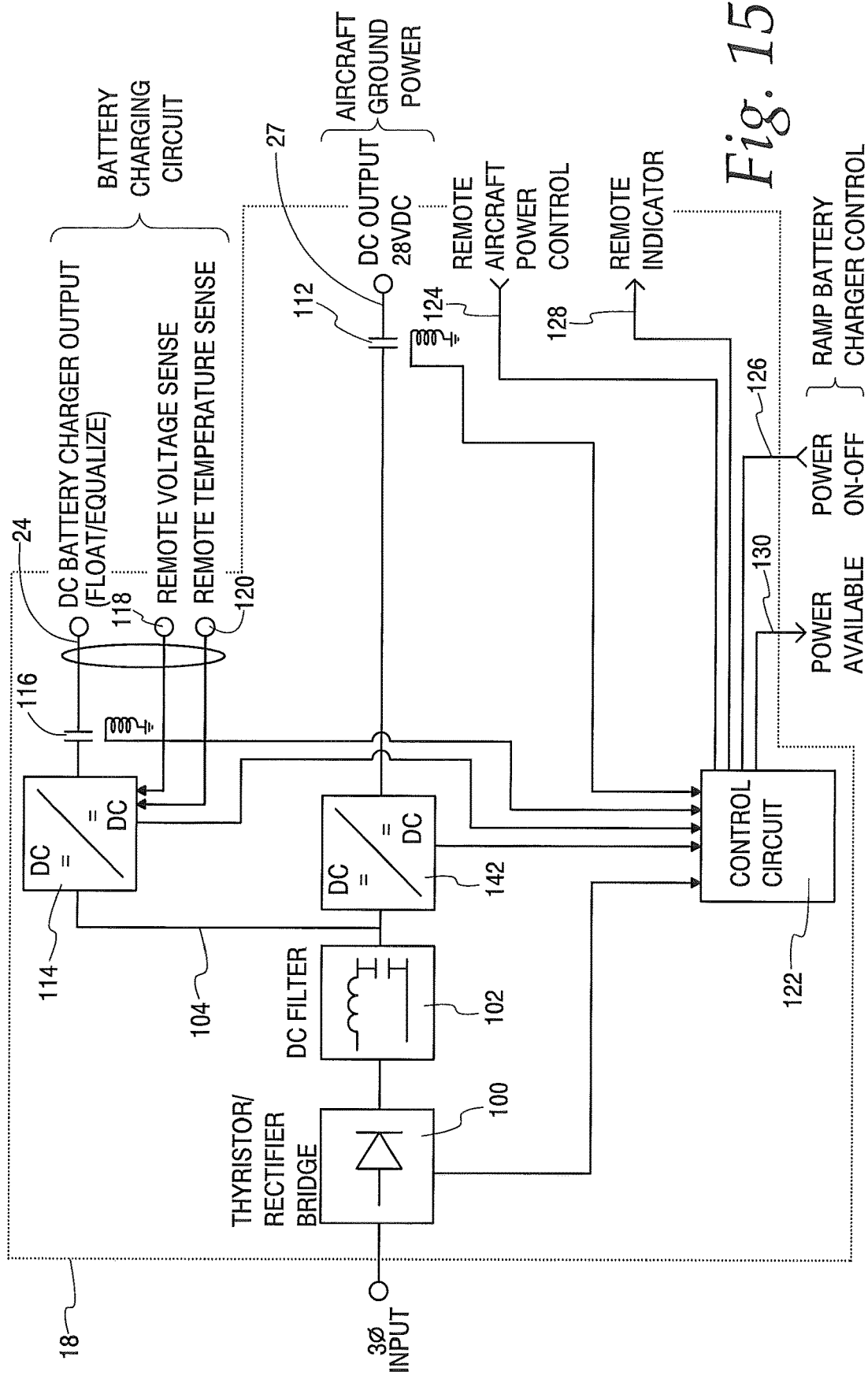
FIG. 15 is a simplified schematic diagram of a dual function power converter constructed in accordance with the disclosure which provides DC ground power to a parked aircraft.

It will be further appreciated that the dual function power converter of the disclosure can be provided as a converter 140 to supply parked aircraft with DC power instead of AC ground power. In this case, as shown in FIG. 15, the three phase inverter 106 is replaced by a DC to DC converter 142 which converts DC current available on DC bus 104 to a lower voltage DC current, typically 28 volts DC. This lower voltage DC current is supplied through contactor 112 to power cable 27 for application to a parked aircraft. In this case, output filter 108 and output transformer 110 are not required. The DC to DC converter 114 provided for the battery charging function remains unchanged. In all other respects, dual function solid state converter 140 is identical to power converter 18, and may be utilized on a passenger boarding bridge, on a wheeled cart, or a stationary installation.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention if its broader aspects, and, therefore, the aim in the appended claims is to cover all such changes and modifications as fall within the true spirit and scope of the present disclosure.

What is claimed is:

1. A dual-purpose power converter operable from an applied alternating current supply and providing a primary AC output current and a secondary DC output current for use in a jetway adapted to service an aircraft parked on an associated ramp, comprising:
    a first cable set for connecting the primary AC output current to the aircraft;
    a second cable set for connecting the secondary DC output current to a ground service vehicle parked on the ramp;
    said second cable set having a deployed state enabling said cable to extend to the ramp to connect to said ground service vehicle, and a retracted state depending from the jetway and free and clear of the ramp;
    said jetway including an electrically-powered positioning system controlled by control circuits in response to operator inputs, operable from the applied alternating current supply, for positioning the jetway on the ramp relative to the aircraft; and
    a motion inhibit circuit in communication with the applied alternating current supply, said inhibit circuit including a switch to provide an inhibit signal to said control circuits, said switch actuated by said second cable set when said cable set is in said retracted state, for preventing movement of said jetway by said positioning system when said second cable set is not in said retracted state.

2. A multi-purpose power converter as defined in claim 1 wherein said motion inhibit circuit comprises a switch disposed on said jetway and mechanically actuated by the position of said secondary cable set.

3. A multi-purpose power converter as defined in claim 2 wherein said switch is actuated by the weight of said secondary cable set.

4. A multi-purpose power converter as defined in claim 1 wherein said switch includes one or more spring biased pressure switches.

* * * * *